(12) United States Patent
Marquezan et al.

(10) Patent No.: US 11,777,749 B2
(45) Date of Patent: Oct. 3, 2023

(54) DEVICES AND METHODS FOR ANALYTICS EXPOSURE TO APPLICATION FUNCTIONS IN 5G NETWORKS

(71) Applicant: Huawei Technologies Co., Ltd., Shenzhen (CN)

(72) Inventors: Clarissa Marquezan, Munich (DE); Riccardo Trivisonno, Munich (DE); Qing Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/320,960

(22) Filed: May 14, 2021

(65) Prior Publication Data
US 2021/0273856 A1  Sep. 2, 2021

Related U.S. Application Data

(63) Continuation of application No. PCT/EP2018/081549, filed on Nov. 16, 2018.

(51) Int. Cl.
*H04L 9/32* (2006.01)
*H04L 41/142* (2022.01)
(Continued)

(52) U.S. Cl.
CPC .......... *H04L 9/3297* (2013.01); *G06F 16/164* (2019.01); *H04L 41/142* (2013.01);
(Continued)

(58) Field of Classification Search
CPC ...... G06F 21/645; G06F 16/248; G06F 16/11; G06F 16/13; G06F 16/164; H04L 9/3236;
(Continued)

(56) References Cited

U.S. PATENT DOCUMENTS

2011/0167153 A1    7/2011  Maes
2014/0378091 A1*  12/2014  Irwin .................... H04M 15/49
                                                        455/405
(Continued)

FOREIGN PATENT DOCUMENTS

CN    102664888 A    9/2012
CN    107968783 A    4/2018
(Continued)

OTHER PUBLICATIONS

LG Electronics, "Solution for KI#2", SA WG2 Meeting #129, S2-1810558, Dongguan, P.R. China, Oct. 15-19, 2018, 4 pages.
(Continued)

*Primary Examiner* — Kyung H Shin
(74) *Attorney, Agent, or Firm* — Slater Matsil, LLP

(57) ABSTRACT

The disclosure relates to a first entity for a communication network, in particular a mobile communication network, configured to obtain, from a second entity and/or a third entity, information for the second entity comprising a request for analytics information and/or a request for a rule related to analytics information that can be provided by the first entity. The first entity can be further configured to provide to the second entity analytics information according to one or more rules, in particular according to the request for analytics information, and/or the requested rule. Alternatively, the first entity can be further configured to forward the obtained information to a fourth entity according to one or more rules. Moreover, the disclosure relates to a corresponding method.

18 Claims, 11 Drawing Sheets

(51) Int. Cl.
*H04L 41/16* (2022.01)
*H04L 43/04* (2022.01)
*H04M 15/00* (2006.01)
*G06F 16/16* (2019.01)
*H04W 24/02* (2009.01)

(52) U.S. Cl.
CPC .............. *H04L 41/16* (2013.01); *H04L 43/04* (2013.01); *H04M 15/49* (2013.01); *H04W 24/02* (2013.01)

(58) Field of Classification Search
CPC ... H04L 9/3297; H04L 41/0823; H04L 41/14; H04W 24/02; H04M 15/49; H04M 15/59; H04M 15/8038; H04M 15/58
See application file for complete search history.

(56) References Cited

U.S. PATENT DOCUMENTS

| | | | |
|---|---|---|---|
| 2017/0161288 A1* | 6/2017 | Feldman | G06F 16/164 |
| 2017/0317894 A1 | 11/2017 | Dao et al. | |
| 2018/0077590 A1 | 3/2018 | Sharma et al. | |
| 2018/0262924 A1 | 9/2018 | Dao et al. | |
| 2018/0268151 A1* | 9/2018 | Cuomo | H04L 9/3297 |
| 2021/0250785 A1* | 8/2021 | Örtenblad | H04W 24/02 |

FOREIGN PATENT DOCUMENTS

| | | |
|---|---|---|
| EP | 3332560 A1 | 6/2018 |
| JP | 2010267070 A | 11/2010 |
| WO | 2018070740 A1 | 4/2018 |

OTHER PUBLICATIONS

Huawei et al., "New Solution for Analytics Exposure to AF", SA WG2 Meeting #129, S2-1811191, Dongguan, P.R. China, Oct. 15-19, 2018, 3 pages.
3GPP TR 23.791 V1.1.0 (Nov. 3, 2018), 3rd Generation Partnership Project; Technical Specification Group Services and System Aspects; Study of Enablers for Network Automation for 5G (Release 16), 66 pages.
Huawei et al., "New Solution for Analytics Exposure to AF", SA WG2 Meeting #129, S2-1810694, Dongguan, China, Oct. 15-19, 2018, 2 pages.
Huawei et al., "Discussion about NWDAF interactions with OAM", SA WG2 Meeting #128, S2-186972, Vilnius, Lithuania, Jul. 2-6, 2018, 13 pages.
Nokia et al., "TR 23.791: Key issue on Analytic Information Exposure to AF", SA WG2 Meeting #126, S2-182139, Montreal, Canada, Feb. 26-Mar. 2, 2018, 2 pages.
3GPP TS 29.122 V15.1.0 (Sep. 2018), 3rd Generation Partnership Project; Technical Specification Group Core Network and Terminals;T8 reference point for Northbound APIs (Release 15), 273 pages.
3GPP TR 23.791 V1.0.0 (Oct. 2018), 3rd Generation Partnership Project; Technical Specification Group Services and System Aspects; Study of Enablers for Network Automation for 5G (Release 16), 97 pages.
3GPP TS 23.502 V15.3.0 (Sep. 2018), 3rd Generation Partnership Project; Technical Specification Group Services and System Aspects; Procedures for the 5G System; Stage 2 (Release 15), 329 pages.
3GPP TS 23.501 V15.3.0 (Sep. 2018), 3rd Generation Partnership Project; Technical Specification Group Services and System Aspects; System Architecture for the 5G System; Stage 2 (Release 15), 226 pages.
Huawei et al., "New Solution for Analytics Exposure to AF", SA WG2 Meeting #129, S2-1811074 (Revision of S2-1810694), Oct. 15-19, 2018, Dongguan, China, 3 pages.

* cited by examiner

| Service Name | Service Operations | Operation Semantics | Example Consumer(s) |
|---|---|---|---|
| Nnef_AnalyticsVisibilityManagement | Create | Request/Response | OAM / PCF |
| | Update | Request/Response | OAM / PCF |
| | Delete | Request/Response | OAM / PCF |
| | Query | Request/Response | AFs, OAM, NFs |
| | EventSubscribe | Subscribe/Notify | AFs, OAM, NFs |
| | EventUnsusbcribe | | |
| | EventNotify | | |
| | ControlActivation | Request/Response | OAM / PCF |
| | ControlDeactivation | Request/Response | OAM / PCF |

Fig. 6

| Information name | Description | Category |
|---|---|---|
| AVR Identifier | Uniquely identifies a configured AVR | Mandatory |
| AF identifier | Identifies the not trusted AF that is interacting with NFs | Mandatory |
| Analytics Broker Service Model identifier | Identifies which type of broker service model is associated with the not trusted AF requests for analytics | Mandatory |
| Visible Analytics | Defines the list of analytics (analytics identification as EventIDs as defined in TR 23.791) that can be consumed by a 3rd Party AF | Mandatory |
| Temporal Validity | Describes the interval of time that an AVR ID is valid (i.e., when the enhanced 5G NF will apply the defined restrictions) | Mandatory |
| Visibility of Inbound Analytics Parameters | For each visible analytics the operator can further define which parameters the 3rd Party AF can customize when subscribing/requesting to such visible analytics | Mandatory for surrogate exposure service model |
| Configuration of inbound analytics parameters | When the operator defines that certain inbound analytics parameters cannot be customized by 3rd Party requests/subscriptions, the operator defines the default inbound parameters that shall be used by the Analytics Broker to subscribe/request analytics to the Analytics Function on behalf of the 3rd Party AF. | Mandatory for surrogate exposure service model |
| Temporal Inbound Validity | Define the interval of time that visibility and configuration of inbound parameters are valid. | Mandatory for surrogate exposure service model |
| Visibility of Outbound Analytics Parameters | For each visible analytics the operator can further define which parameters of the notification/response associated with a generated analytics can be disclosed to the 3rd Party AF | Mandatory for surrogate exposure service model |
| Configuration of outbound analytics parameters | When the operator defines that restrictions should apply for certain outbound analytics parameters, the operator defines the filters to be applied to outbound parameters that shall be used by the Analytics Broker to notify the 3rd Party AF. One possible example of filter is: anonymization of operator's sensitive data, such as identifiers of network slices or NFs associated with the generated analytics. | Mandatory for surrogate exposure service model |
| Temporal Outbound Validity | Define the interval of time that visibility and configuration of outbound parameters are valid. | Mandatory for surrogate exposure service model |

Fig. 7

DEVICES AND METHODS FOR ANALYTICS EXPOSURE TO APPLICATION FUNCTIONS IN 5G NETWORKS

CROSS-REFERENCE TO RELATED APPLICATIONS

This application is a continuation of International Application No. PCT/EP2018/081549, filed on Nov. 16, 2018, the disclosure of which is hereby incorporated by reference in its entirety.

TECHNICAL FIELD

Generally, the present disclosure relates to the field of telecommunications. More specifically, the present disclosure relates to devices, systems and methods for exposure of analytics information to third party application functions in communication networks, in particular 5G networks.

BACKGROUND

Current solutions for exposing third party application functions (AFs) to analytics information collected in a communication network, in particular a 5G communication network, do not allow the network operator to differentiate/customize the treatment for requests from third Party AFs to subscribe to analytics information, which in the framework of a 5G communication network is provided by a Network Data Analytics Function (NWDAF). For instance, different third party AF requests may not apply different parameters on the request for NWDAF analytics information. Current solutions only allow the authorization on the analytics information type (i.e., EventID level) and this leads to a single mode of operation where either 3rd Party AFs are allowed or not allowed to consume the analytics information.

Thus, there is a need for improved devices, systems and methods for exposing analytics information collected in a communication network, in particular a 5G communication network, to third party application functions implemented in the communication network.

SUMMARY

Embodiments of the disclosure are defined by the features of the independent claims, and further advantageous implementations of the embodiments by the features of the dependent claims.

Generally, embodiments of the disclosure provide entities, service models, data structures, services and methods for allowing third party AFs to consume analytics information from 5G operator's Analytics Function (e.g., NWDAF), as well as, enabling operators to customize the exposure of analytics information by applying distinct exposure service models to different 3rd Party AFs.

More specifically, according to a first aspect, the disclosure relates to a first entity for a communication network, in particular a mobile communication network. The first entity is configured to:

obtain, from a second entity and/or a third entity, information for the second entity comprising one or more of: a request for analytics information; a request for a rule related to analytics information that can be provided by the first entity;

provide to the second entity one or more of: analytics information according to one or more rules, in particular according to the request for analytics information; the requested rule; or forward the obtained information to a fourth entity according to one or more rules.

The first to fourth entities can be single or distributed physical devices, such as servers, of the communication network and/or can comprise or be provided by one or more network functions implemented on one or more physical devices of the communication network.

As will be described in more detail further below, according to embodiments of the disclosure, the first entity can be implemented as an analytics function, in particular a NWDAF, of the communication network, the second entity can be implemented as a $3^{rd}$ party AF of the communication network and/or the third entity can be implemented as an (enhanced) NF of the communication network. According to further embodiments of the disclosure, the first entity can be implemented as an (enhanced) NF of the communication network, the second entity can be implemented as a $3^{rd}$ party AF of the communication network, and/or the fourth entity can be implemented as a network function or an analytics function, in particular a NWDAF, of the communication network.

If the information is obtained from a third entity, the third entity was not in a condition to provide the analytics information and/or the rule according to the request. But, of course, it can apply a rule, in particular for forwarding the information. If the obtained information is forwarded to a fourth entity, the first entity was not in a condition to provide the analytics information and/or rule according to the request. Hence, there could be the situation in which the information of a second entity is forwarded several times until it is obtained by an entity which is in a condition to provide the requested analytics information and/or the requested rule.

In a further possible implementation form of the first aspect, a rule is based on one or more of:

an inbound restriction, defining aspects, i.e. subsets of the parameters related to analytics information, which the second entity is allowed to use, in particular in a request to consume analytics information; and/or an outbound restriction, defining aspects the second entity is allowed to obtain, in particular in a response from an analytics information; and/or a temporal restriction, defining when the second entity is allowed to access the analytics information.

Thus, as used herein, a "rule" defines one or more restrictions related to the way that entities are authorized to consume analytics information, which restrict the full access to the analytics information to a restricted access. As will be described in more detail below, a "rule" as used herein can be implemented, for instance, in the form of a data structure (herein referred to as Analytics Visibility Rule (AVR) data structure).

In a further possible implementation form of the first aspect, the first entity is configured to obtain at least partly the analytics information from a fifth entity, in particular a network data analytics function, NWDAF, of the communication network.

In a further possible implementation form of the first aspect, the first entity is configured to provide the analytics information to the second entity, in particular in response to a request or a subscription request, in case the request or subscription request complies with the one or more rules.

In a further possible implementation form of the first aspect, the rule, in particular the one or more inbound restrictions, is related to one or more aspects of the analytics information which the second entity is allowed to request access and/or subscribe to, in particular by relating to one or more parameters and/or parameter ranges of the analytics information.

In a further possible implementation form of the first aspect, the rule, in particular the one or more outbound restrictions, is related to one or more aspects of the analytics information which the second entity is allowed to access, in particular to receive as a response to a request and/or subscription, in particular by relating to one or more parameters and/or parameter ranges, and/or parameter formats of the analytics information.

In a further possible implementation form of the first aspect, the first entity is configured to provide to the second entity, in particular by a notification message and/or a response message, the information according to the one or more rules that relate to analytics information that the second entity is not allowed to access. More specifically, the first entity may be configured to provide this information by a notification message in response to a request by the second entity to access analytics information.

In a further possible implementation form of the first aspect, the first entity is configured to adjust one or more rules.

In a further possible implementation form of the first aspect, the one or more rules relate to at least one of the following exposure service models: a first exposure service model, wherein the one or more rules comprise one or more temporal restrictions; and/or a second exposure service model, wherein the one or more rules comprise the one or more outbound restrictions and the one or more temporal restrictions; and/or a third exposure service model, wherein the one or more rules comprises the one or more inbound restrictions and/or the one or more outbound restrictions and the one or more temporal restrictions.

In a further possible implementation form of the first aspect, the rule comprises one or more of the following elements: an identifier of a rule; and/or an identifier of the second entity; and/or an identifier of the analytics information; and/or an identifier of an exposure service model associated with the one or more rules.

In a further possible implementation form of the first aspect, a rule comprises information about the one or more inbound restrictions, in particular information about one or more parameters and/or parameter ranges of the analytics information which the second entity is allowed to request access to.

In a further possible implementation form of the first aspect, a rule comprises information about the one or more outbound restrictions, in particular information about one or more parameters and/or parameter ranges, and/or parameters format of the analytics information which the further entity is allowed to access.

In a further possible implementation form of the first aspect, a rule comprises information about the one or more temporal restrictions, in particular information about one or more time windows when the rule is valid, information about one or more time windows when the inbound restrictions are valid and/or information about one or more time windows when the outbound restrictions are valid.

According to a second aspect, the disclosure relates to a communication network, in particular a 5G mobile communication network, wherein the communication network comprises a first entity according to the first aspect of the invention.

According to a third aspect, the disclosure relates to a method of operating a first entity (in a communication network), in particular a 5G mobile communication network, wherein the method comprises the steps of: obtaining, from a second entity and/or a third entity, information for the second entity comprising a request for analytics information and/or a request for a rule related to analytics information that can be provided by the first entity; either providing to the second entity and/or analytics information according to one or more rules, in particular according to the request for analytics information and/or the requested rule; or forwarding the obtained information to a fourth entity according to one or more rules.

Thus, embodiments of the disclosure provide a network function (NF) enhanced with the capability to operate with exposure service models. More specifically, a 5G NF is enhanced for performing interactions between 3rd Party AFs and the Analytics Function (e.g., NWDAF) of the operator's network applying for this interaction the definitions of the exposure service models for each 3rd Party AF and/or for each 3rd Party AF and analytics information association.

Embodiments of the disclosure provide different exposure service models for analytics consumption, namely exposure service models referred herein to as "Mirror", "Restrictive" and "Surrogate".

According to the "Mirror" exposure service model, the consumer, e.g., 3rd Party AF, can have access to the operator's Analytics Function (i.e., NWDAF) functionalities (i.e., using the services operations as they are) and only temporal restrictions to when the consumer, e.g., 3rd Party AFs, are allowed to consume the analytics information can be enforced.

According to the "Restrictive" exposure service model, the consumer, e.g., 3rd party AFs, can have restricted access to the analytics information available in Analytics Function where temporal and outbound restrictions can be enforced by the operator.

According to the "Surrogate" exposure service model, the consumer, e.g., 3rd Party AFs, can obtain only analytics allowed by the operator where temporal, inbound, and outbound restrictions can be enforced by the operator.

As already described above, according to embodiments of the disclosure, the restrictions for operation parameters can comprise inbound restrictions, outbound restrictions and/or temporal restrictions.

According to embodiments of the disclosure, the enhanced NF applies inbound restrictions defined by the operator to the parameters of a subscription/request to the Analytics Function on behalf of the consumer, e.g., 3rd Party AF. The restrictions can be, for instance, on the range of values that can be applied for a certain parameter (e.g., periodicity of report no lower than 1 hour) or they can be the denial of 3rd Party AFs indicating values for parameters (e.g., definition of target of event reporting). In this last case, the operator can configure default values to be used by the enhanced NF when it subscribes to receive analytics information from the Analytics Function on behalf of the 3rd Party AF.

According to embodiments of the disclosure, the enhanced NF applies outbound restrictions defined by the operator to the parameters of a notification/response that the consumer, e.g., 3rd Party AF, is allowed to receive. For instance, removing the probability assertion of the response, or exposing only the first values of an analytics recommendations, or enforcing anonymization of fields from analytics information with sensible information that operators do not want to expose.

According to embodiments, the one or more "rules" related to analytics information can be implemented as an analytics visibility rule (AVR) data structure. According to embodiments of the disclosure, the AVR data structure captures in terms of parameters the exposure service models, i.e. the one or more rules. In other words: the AVR data structure defines which analytics information are visible by each consumer, e.g., 3rd Party AF, as well as how and when the consumer, e.g., 3rd Party AFs, can consume the allowed analytics information in accordance with the exposure service models associated with the consumer, e.g., 3rd Party AF. Thus, for instance, the AVR data structure allows operators to customize how 3rd Party AFs interact with operator's analytics services for obtaining (subscribe/notify and/or request/response) analytics. The operator can define per 3rd Party AF an AVR, and this information will be used by the enhanced NF for the subsequent subscribes/requests to analytics information from the Analytics Function as well as to notify/respond to the 3rd Party AF requests for analytics information.

Embodiments of the disclosure define procedures, i.e. services to enable the configuration and management of the exposure service models.

More specifically, according to embodiments of the disclosure, a new procedure, i.e. service is provided to be exposed by the enhanced NF for the creation, update, deletion, query, subscribe/notify, and control validity of exposure service models, where AVR is one possible data structure to be used as the data structure representing the exposure service model. The consumers of such service can be either the operator OAM or another NF (e.g., PCF) from the communication network, for the creation, update, and deletion of the configuration of the exposure service models, while query and subscribe/notify operations of such method can be performed by any authorized AF, NF, and/or operator.

Moreover, according to embodiments of the disclosure, extension of output fields of the service for event exposure subscription/requests are provided to include the field "Failure Reason". According to embodiments of the disclosure, possible values for the "Failure Reason" are:

i. Forbidden Analytics: the 3rd Party AF is not allowed to subscribe to the requested information, in this case, the analytics information.

ii. Unauthorized Analytics Input Parameters: the 3rd Party AF is not allowed to subscribe to the requested information using the parameters included in the subscription/request. Examples might be that the 3rd Party AF attempted to subscribe to an analytics information using a target of event reporting containing "Per network slice", when the AVR for the 3rd Party does not allow this level of target of event reporting or that operators might want to define per 3rd Party AF the observation period parameter for NWDAF analytics.

iii. Temporarily Invalid Request: the 3rd Party AF is not allowed to receive analytics information for a given period of time.

Embodiments of the disclosure enable a fine grained control and configuration of how 3rd party AFs interact with 5G NFs to consume analytics from NWDAF. Embodiments of the disclosure allow operators to decide which information, when and how the analytics can be exposed to 3rd party AFs. Embodiments of the disclosure enable monetization of analytics exposure to 3rd Party AFs. More specifically, vendors, as well as operators, can apply different payment methods for the different exposure service models to allow 3rd party AF to consume analytics.

Embodiments of the disclosure provide an enhanced 5G NF with the capability to apply different exposure service models, i.e. different models of restriction for consumers of analytics information of 5G networks (e.g., 3rd Party AFs, AFs, NFs, OAM), where the exposure service models are configured with least one of the following aspects: restriction to inbound parameters to obtain, in particular request/subscribe to, analytics information; restrictions to outbound parameters to obtain, in particular receive and/or be notified, of analytics information; and/or temporal restrictions defining when in time the consumer is allowed to obtain, in particular request/subscribe and/or receive response and/or be notified, analytics information.

Embodiments of the disclosure provide a further NF, in particular the enhanced 5G NF, with the capability to: configure the aspects, i.e. the AVR of the exposure service models; obtaining, in particular using querying/response and/or subscribing/notify, the AVR information configured for the consumers of analytics information; providing information, in particular as a response code, about requests/subscriptions from consumers of analytics information that do not complies with the aspects of the exposure service models; receiving requests/subscriptions to analytics information, and apply the exposure service models associated with the request for further requesting the analytics information to another NF that is able to generate analytics information, and/or generating the analytics information; and/or providing analytics information, in particular notifying/sending response, to consumers applying the exposure service models.

According to embodiments of the disclosure, the aspects of the exposure service models, i.e. the AVR data structure, to support the configuration of the exposure service models per analytics consumer (e.g., 3rd Party AF) and/or per analytics information, can be associated with one or more of the following information: Identification of the AVR; Identifier of the consumer of the analytics information; Identifier of the analytics information; Identifier of the exposure service model; Visibility of inbound parameters of the analytics information, defines which fields of subscription/request to analytics information can be used by the consumer; Configuration of inbound parameters of the analytics information, defines which values for the visible fields of subscription/request to analytics information can be used by the consumer; Visibility of outbound parameters of the analytics information, defines which fields of notification/response with analytics information can be obtained by the consumer; Configuration of outbound parameters of the analytics information, defines which values for the visible fields of notification/response of analytics information can be used by the consumer; Temporal validity that describes the interval of time that the AVR is valid (i.e., when the enhanced 5G NF will apply the defined restrictions); Temporal validity of inbound parameters, define the interval of time that visibility and configuration of inbound parameters are valid; Temporal validity of outbound parameters, define the interval of time that visibility and configuration of outbound parameters are valid.

Embodiments of the disclosure provide methods to allow consumers (e.g., 3rd Party AFs) to obtain analytics information from the 5G NF enhanced with the capability to apply exposure service models.

Embodiments of the disclosure provide methods to configure the 5G NF enhanced with the capability to apply exposure service models to expose analytics information of 5G networks, in particular notify and/or send responses to consumers that requested/subscribed for the analytics information.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which:

FIG. 6 is a table illustrating services provided by a network exposure function for managing one or more rules for accessing analytics information as implemented by embodiments of the disclosure;

FIG. 7 is a table illustrating aspects of the Analytics Visibility Rule (AVR) data structure as implemented by embodiments of the disclosure;

Figure 1:
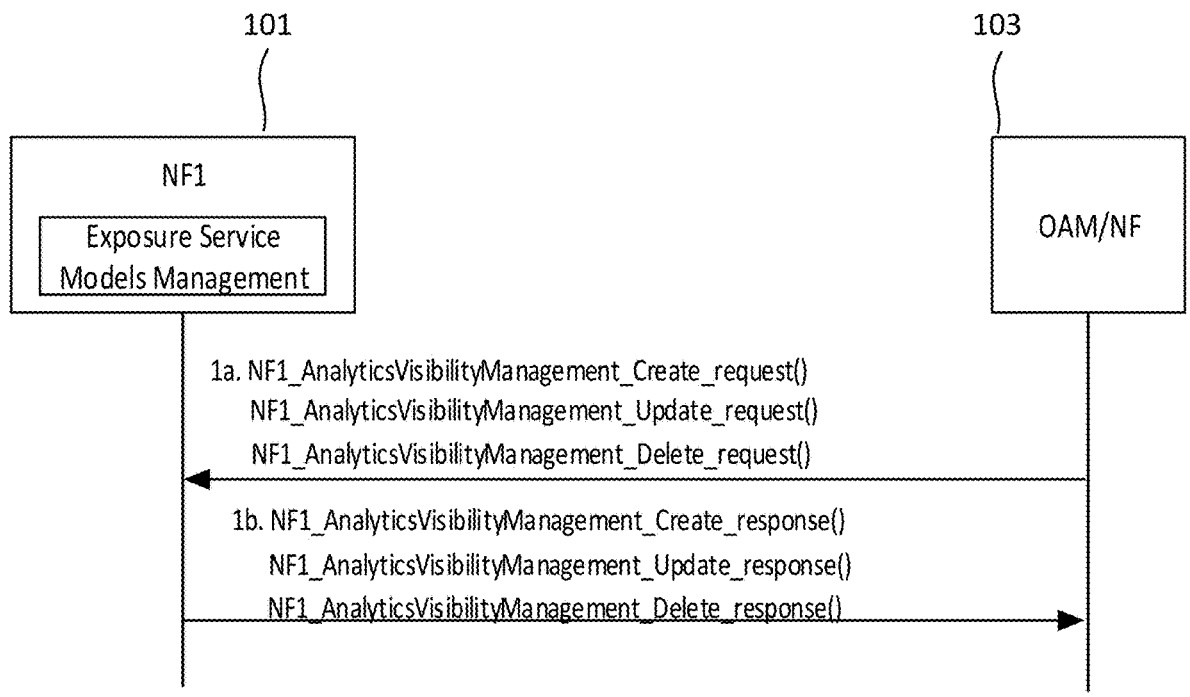
FIG. 1 is a diagram illustrating the configuration of exposure service models as implemented by embodiments of the disclosure.

In the following, identical reference signs refer to identical or at least functionally equivalent features.

DETAILED DESCRIPTION OF ILLUSTRATIVE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

The following detailed description of embodiments of the disclosure is structured into two main parts. A first main part provides a detailed description of the management of exposure service models implemented by embodiments of the disclosure, in particular the configuration of aspects of exposure service models in the context of FIG. 1, the querying of exposure service model information in the context of FIG. 2 and the temporal control of analytics information exposure in the context of FIG. 3. A second main part provides in the context of FIG. 4 and the following figures a detailed description of the consumption of analytics information using exposure service models as implemented by embodiments of the disclosure.

As will be described in more detail below, in the context of FIGS. 1 to 4, the disclosure provides a first entity for a communication network, in particular a 5G mobile communication network, configured to obtain, from a second entity and/or a third entity, information for the second entity comprising a request for analytics information and/or a request for a rule related to analytics information that can be provided by the first entity. The first entity can be further configured to provide to the second entity analytics information according to one or more rules, in particular according to the request for analytics information, and/or the requested rule. Alternatively, the first entity can be further configured to forward the obtained information to a fourth entity according to one or more rules. Moreover, the disclosure provides a corresponding method of operating the first entity.

The first to fourth entities can be single or distributed physical devices, such as servers, of the communication network and/or can comprise or be provided by one or more network functions implemented on one or more physical devices of the communication network.

As will be described in more detail further below, according to embodiments of the disclosure, the first entity can be implemented as the analytics function, in particular the NWDAF 403 illustrated, for instance, in FIG. 4, the second entity can be implemented as the $3^{rd}$ party AF 201 illustrated, for instance, in FIGS. 2 and 4, and/or the third entity can be implemented as the (enhanced) NF 101 illustrated, for instance, in FIGS. 1 to 4. According to further embodiments of the disclosure, the first entity can be implemented as the (enhanced) NF 101 illustrated, for instance, in FIGS. 1 to 4, the second entity can be implemented as the $3^{rd}$ party AF 201 illustrated, for instance, in FIGS. 2 and 4, and/or the fourth entity can be implemented as the further network function NF2 illustrated, for instance, in FIG. 4 or the analytics function, in particular the NWDAF, 403 illustrated, for instance, in FIG. 4.

As can be taken from steps 1a and 1b shown in FIG. 1, the operator, i.e. OAM and/or a 5G NF, such as a PCF, 103 may invoke the "AnalyticsVisibilityManagement_Create" service operation exposed by NF1 101 (which is enhanced with the analytics exposure) to configure the AVR data structure for consumers of analytics, e.g., 3rd Party AFs, according with their exposure service models negotiated, for instance, between the operator and the 3rd Party AF (pre-stage before AF uses the operator network).

Figure 2:
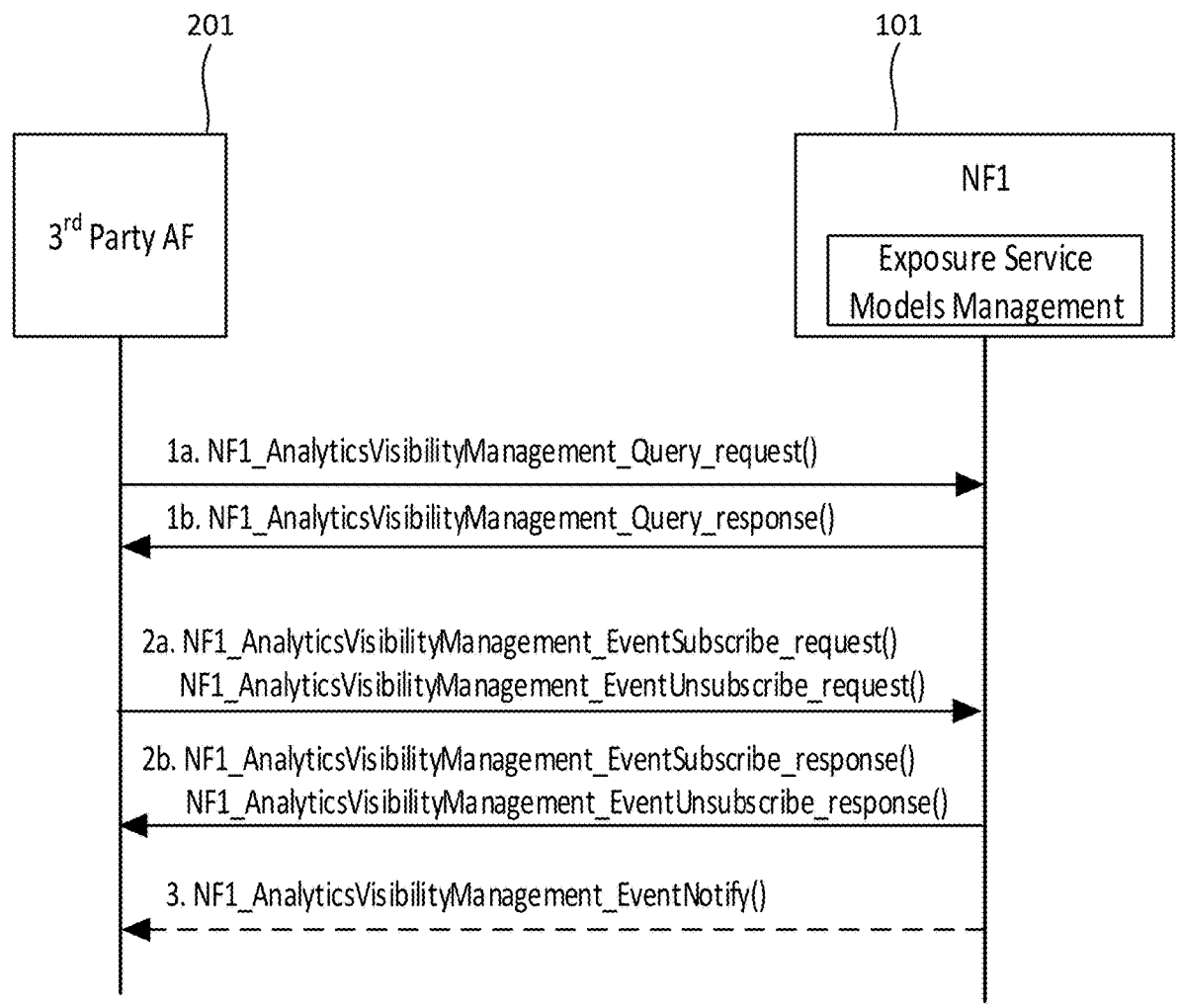
FIG. 2 is a diagram illustrating querying of information about exposure service models associated with an application function as implemented by embodiments of the disclosure.

Referring now in more detail to FIG. 2, according to embodiments of the disclosure, querying of exposure service model information can be implemented in the following way.

In an optional first step, the 3rd Party AF 201, for instance but not excluding other consumers of analytics information, e.g. NFs/AFs/OAM, may query NF1 101 and retrieve its AVR information. It is also possible that the 3rd Party AF(s) 201 already has this information without the need to query NF1 101, for instance, based on agreements between the 3rd Party and the operator prior to the 3rd Party AF 201 start using the operator's network.

More specifically, according to a first variant (illustrated as step 1a. in FIG. 2), the 3rd Party AF 201 may invoke the "NF1_AnalyticsVisibilityManagement_Query_request" service operation of the NF1 101 to request the AVR information. According to a second variant (illustrated as step 1b in FIG. 2), the NF1 101 may send a response using the "NF1 AnalyticsVisibilityManagement_Query_response" service operation with the AVR information to the 3rd Party AF 201, if it has been configured with such information for the specific 3rd Party AF 201.

In a second step 2, the 3rd Party AF 201 may subscribe/unsubscribe to the NF1 101 to receive notifications about AVR information, either creation of new AVRs or changes in the existing ones.

More specifically, according to a first variant (illustrated as step 2a in FIG. 2), the 3rd Party AF 201 may invoke the "NF1_AnalyticsVisibilityManagement_EventSubscribe_request" service operation of the NF1 101 to subscribe to an AVR information status and the "NF1_AnalyticsVisibility Management_EventUnsubscribe_request" service operation to stop receiving the AVR information status. According to a second variant (illustrated as step 2b in FIG. 2), the NF1 101 may send a response using "NF1_Analytics VisibilityManagement_EventSubscribe_response" or "AnalyticsVisibilityManagement_EventUnsubscribe_response" service operations to the 3rd Party AF 201 including a confirmation or rejection of the subscription/unsubscription to the AVR information status.

In a third step (illustrated as step 3 in FIG. 2), the NF1 101 using the "NF1 AnalyticsVisibilityManagement_EventSubscribe_response" service operation sends to the 3rd Party AF 201 notifications about the subscribed events on the AVR status, when they happen.

Figure 3:
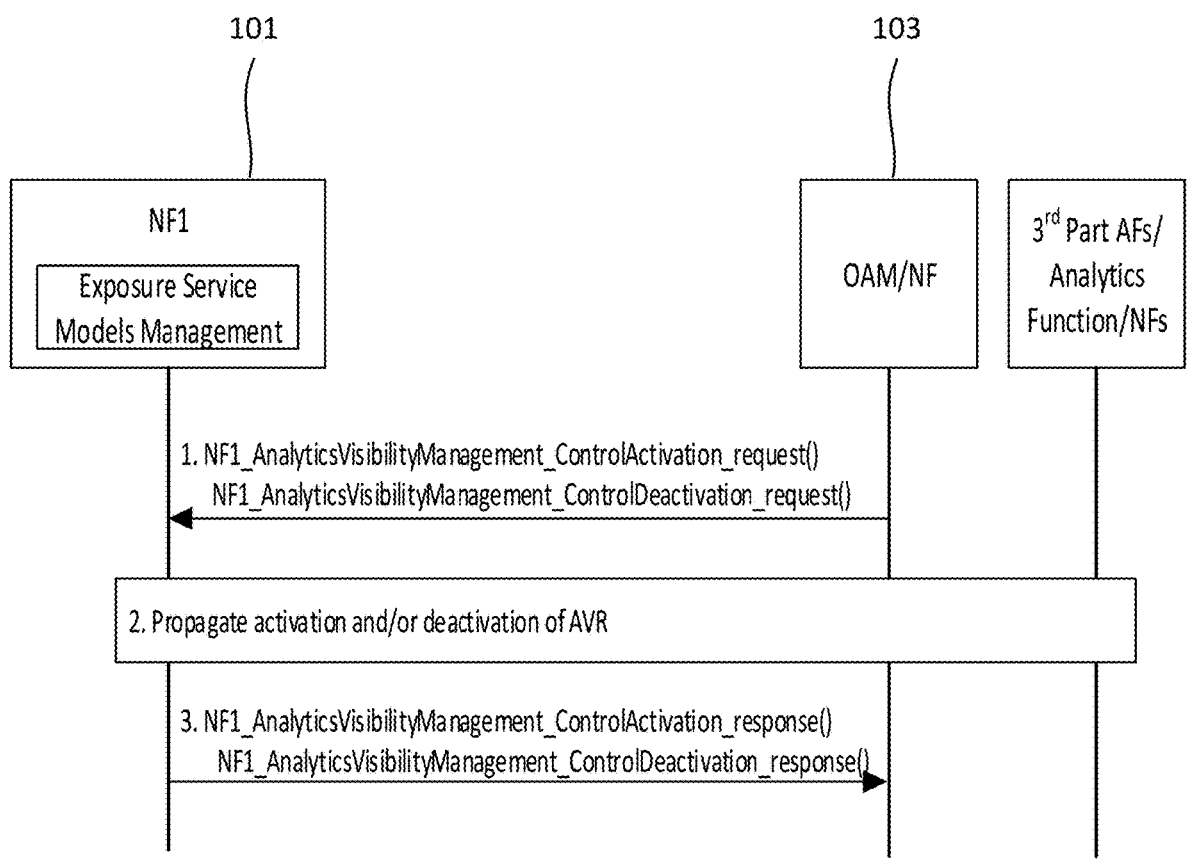
FIG. 3 is a diagram illustrating the activation and deactivation of temporal restriction of a rule for accessing analytics information as implemented by embodiments of the disclosure.

Referring now in more detail to FIG. 3, according to embodiments of the disclosure, temporal control of analytics information exposure can be implemented in the following way.

In a first step (illustrated as step 1 in FIG. 3), the OAM and/or the 5G NF (e.g., PCF) 103 may invoke "AnalyticsVisibilityManagement_ControlActivation_request" and/or "AnalyticsVisibilityManagement_ControlDeactivation_request" service operations exposed by the NF1 101 to configure the temporal restriction of the AVR for 3rd Party AFs.

In a second step (illustrated as step 2 in FIG. 3), the NF1 101 may trigger the necessary steps to enforce the activated or deactivated temporal restrictions of an AVR. For instance, if a temporal restriction is the deactivation of an AVR ID, turning it into invalid, the NF1 101 can either indicate to 3rd Party AFs to unsubscribe to analytics information, or it can configure the analytics function of the network not to generate the analytics information for the 3rd Party AF 201 associated with the deactivated AVR.

In a third step (illustrated as step 3 in FIG. 3), the NF1 101 using "AnalyticsVisibilityManagement_ControlActivation_response" and/or "AnalyticsVisibilityManagement_ControlDeactivation_response" service operations may indicate to the OAM and/or 5G NF 103 the status of the requested temporal restriction action.

Figure 4:
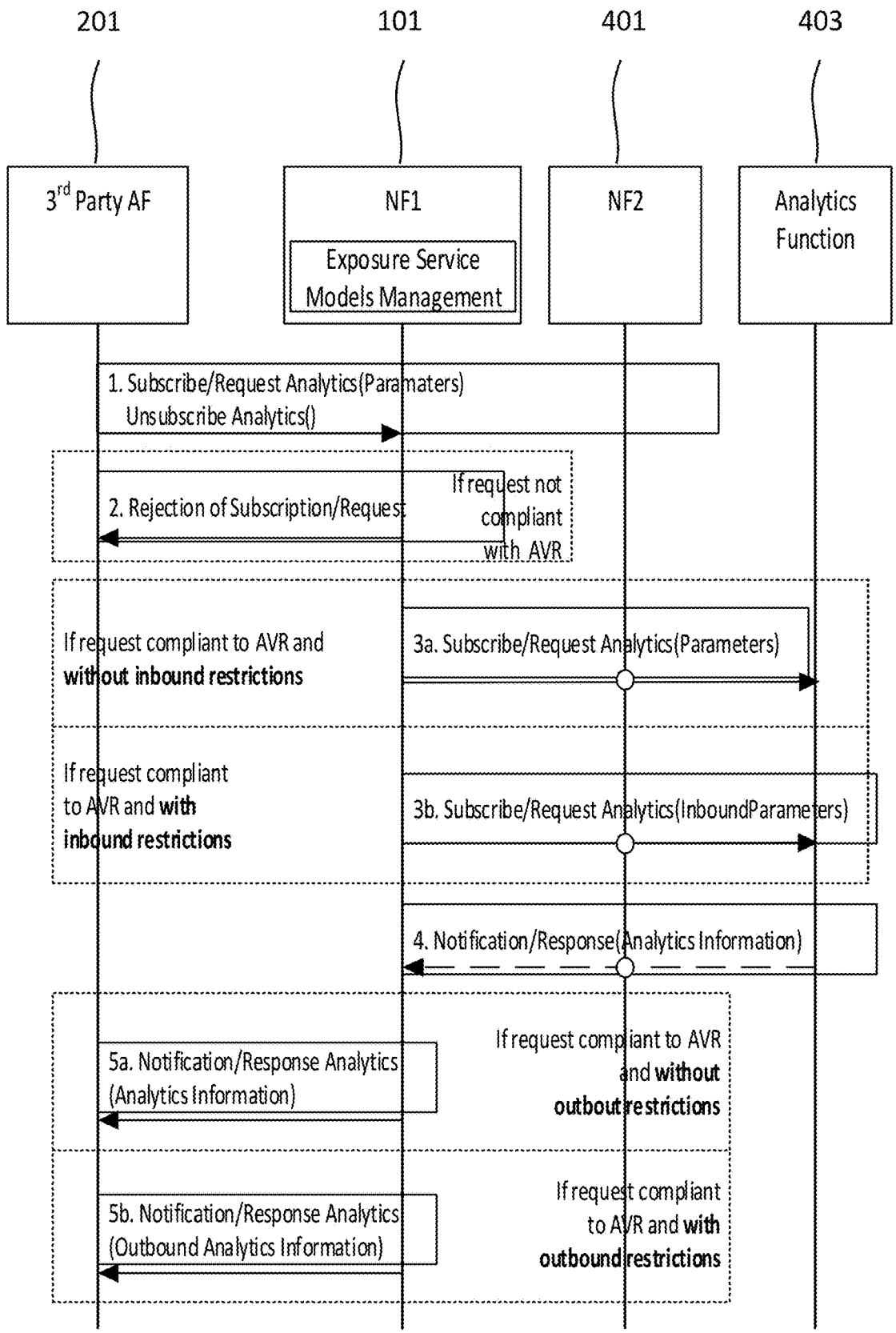
FIG. 4 is a diagram illustrating the exposure of analytics information to an application function based on exposure service models as implemented by embodiments of the disclosure.

Referring now in more detail to FIG. 4, according to embodiments of the disclosure, consumption of analytics using exposure service models can be implemented in the following way.

In a first step (illustrated as step 1 in FIG. 4), the 3rd Party AF 201 may invoke the "NF1_EventSubscription_ Subscribe_Request" service operation from the NF1 101 to subscribe to analytics information. The 3rd Party AF 201 may also invoke the "NF1_EventSubscription_Unsubscribe" service operation to cancel a subscription to analytics information.

If the 3rd party AF subscription/request is not compliant with the AVR, the NF1 101 in a further step (illustrated as step 2 in FIG. 4) does not forward the request further to the Analytics Function 403, and sends using the "NF1_ EventSubscription_Subscribe_Response" service operation a rejection response to the 3rd Party AF 201 with the defined Response codes.

Alternatively, i.e. if the 3rd party AF subscription/request is compliant with the AVR, the NF1 101 in a further step subscribes to the Analytics Function 403 in accordance with the exposure service model associated with the 3rd Party AF subscription/request. More specifically, according to a first alternative (illustrated as step 3a in FIG. 4), if no inbound restrictions apply, the NF1 101 uses the same parameters from the 3rd Party AF 201 and invokes the service operation from the Analytics Function 403 (e.g., "Event_Subscription_ Subscribe_request"). According to a second alternative (illustrated as step 3b in FIG. 4), if inbound restrictions apply, the NF1 101 uses the inbound parameters defined in the AVR data structure and invokes the service operation from the Analytics Function 403 (e.g., "Event_Subscription_ Subscribe_request"). According to an embodiment, the NF1 101 may use an intermediary NF2 (e.g., UDM) 401, if configured by the operator, in order to subscribe to Analytics Function services.

In a further step (illustrated as step 4 in FIG. 4), the Analytics Function 403 may generate subscribed/requested analytics information/data and using its service operation (e.g., "EventSubscription_Notify") sends a notification/response with the analytics information to the NF1 101. The analytics information from the Analytics Function 403 may first be consumed by the intermediary NF2 (e.g., UDM) 401, if configured by the operator, and then NF2 401 may use its service operation (e.g., "EventSubscription_Notify") to further send the analytics information from the Analytics Function 403 to the NF1 101.

Upon receiving a notification/response from the Analytics Function 403, the NF1 101 may send the notification/response to the 3rd Party AF 201 in accordance with the exposure service model associated with the 3rd Party AF subscription/request. More specifically, if no outbound restrictions apply, the same analytics information received from the Analytics Function 403 may be sent to the 3rd Party AF 201 by the NF1 101 using the "NF1_Event_ Subscribe_Notify" service operation, as illustrated in step 5*a* of FIG. 4). Alternatively, i.e. if outbound restrictions apply, the outbound restriction are applied to the analytics information received from the Analytics Function 403, and the outbound analytics information is sent to the 3rd Party AF 201 by the NF1 101 using the "NF1_Event_Subscribe_Notify" service operation, as illustrated in step 5*b* of FIG. 4).

Figure 5:
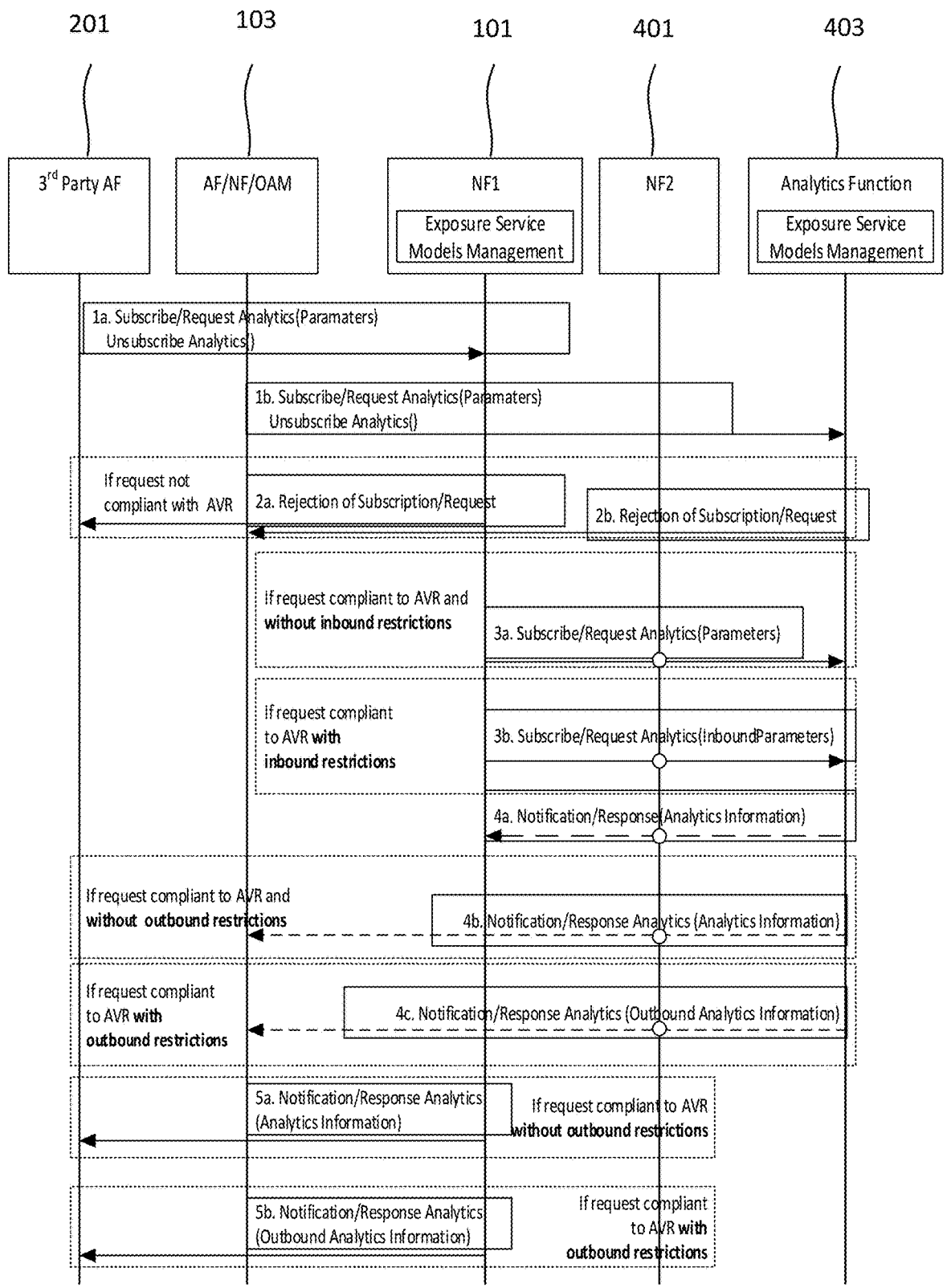
FIG. 5 is a diagram illustrating the exposure of analytics information to an application function based on exposure service models as implemented by further embodiments of the disclosure.

FIG. 5 illustrates an alternative scenario to the scenario illustrated in FIG. 4. In step 1*a* of FIG. 5, the 3rd Party AF 201 invokes the "NF1_EventSubscription_ Subscribe_Request" service operation from the NF1 101 to subscribe to analytics information. The 3rd Party AF 201 might also invoke the "NF1_EventSubscription_Unsubscribe" service operation to cancel a subscription to analytics information.

In step 1*b* of FIG. 5, OAM, NFs, AFs 103 subscribes to the Analytics Function 403. According to an embodiment, OAM, NFs, AFs 103 may use intermediary NF2 (e.g., UDM) 401, if configured by the operator, in order to subscribe to Analytics Function services.

If the 3rd party AF subscription/request is not compliant with the AVR, the NF1 101 does not forward the request further to the Analytics Function 403, and sends using the "NF1_EventSubscription_Subscribe_Response" service operation a rejection response to the 3rd Party AF 201 with the defined Response codes, as illustrated by step 2*a* of FIG. 5.

Alternatively, if the OAM, NF, AF subscription/request is not compliant with the AVR, the Analytics Function 403 sends using the "EventSubscription_Subscribe_Response" service operation a rejection response with the defined Response codes, as illustrated by step 2*b* of FIG. 5.

If the 3rd party AF subscription/request is compliant with the AVR, the NF1 101 subscribes to the Analytics Function 403 in accordance with the exposure service model associated with the 3rd Party AF subscription/request. More specifically, if no inbound restrictions apply, the NF1 101 uses the same parameters from the 3rd Party AF 201 and invokes the "Event_Subscription_Subscribe_request" service operation from the Analytics Function 403, as illustrated by step 3*a* of FIG. 5. If, alternatively, inbound restrictions apply, the NF1 101 uses the inbound parameters defined in the AVR and invokes the "Event_Subscription_Subscribe_request" service operation from the Analytics Function 403, as illustrated in step 3*b* of FIG. 5. According to an embodiment, the NF1 101 may use the intermediary NF2 (e.g., UDM) 401, if configured by the operator, in order to subscribe to Analytics Function services.

In case the consumer of the analytics information is the NF1 101, the Analytics Function 403 using its "EventSubscription_Notify" service operation sends a notification/response with the analytics information to the NF1 101, as illustrated by step 4*a* of FIG. 5. The analytics information from the Analytics Function 403 may first be consumed by the intermediary NF2 (e.g., UDM) 401, if configured by the operator, and then NF2 401 uses its "EventSubscription_ Notify" service operation to further send the analytics information from the Analytics Function 403 to the NF1 101.

In case the consumer of the analytics information is OAM, NF, AF 103 and no outbound restrictions apply, the Analytics Function 403 using its "EventSubscription_Notify" service operation sends a notification/response with the analytics information to the OAM, NF, AF 103, as illustrated by step 4*b* of FIG. 5. The analytics information from the Analytics Function 403 may first be consumed by the intermediary NF2 (e.g., UDM) 401, if configured by the operator, and then NF2 401 may use its "EventSubscription_Notify" service operation to further send the analytics information from the Analytics Function 403 to the OAM, NF, AF 103.

In case the consumer of the analytics information is OAM, NF, AF 103 and outbound restrictions apply, the Analytics Function 403 applies the outbound restriction over the generated analytics information, and using its "EventSubscription_Notify" service operation sends a notification/response with the outbound analytics information to the OAM, NF, AF 103, as illustrated by step 4*c* of FIG. 5. The outbound analytics information from the Analytics Function 403 may first be consumed by the intermediary NF2 (e.g., UDM) 401, if configured by the operator, and then NF2 401 may use its "EventSubscription_Notify" service operation to further send the outbound analytics information from the Analytics Function 403 to the OAM, NF, AF 103.

Upon receiving a notification/response from the Analytics Function 403, the NF1 101 may send the notification/response to the 3rd Party AF 201 in accordance with the exposure service model associated with the 3rd Party AF subscription/request.

More specifically, if no outbound restrictions apply, the same analytics information received from the Analytics Function 403 is sent to the 3rd Party AF 201 by the NF1 101 using its "NF1_Event_Subscribe_Notify" service operation, as illustrated by step 5*a* of FIG. 5.

If outbound restrictions apply, the outbound restriction are applied to the analytics information received from the Analytics Function 403, and the outbound analytics information is sent to the 3rd Party AF 201 by the NF1 using its "NF1_Event_Subscribe_Notify" service operation, as illustrated by step 5*b* of FIG. 5.

Embodiments of the present disclosure are based on the 3GPP 5G network architecture defined in TS 23.501. There are at least two possible alternatives to extend the current the 3GPP 5G network architecture defined in TS 23.501 to implement embodiments of the disclosure.

According to a first alternative, which is NEF based, the NEF can be extended with the functionality to operate according with the exposure service models and to configure and maintain the AVR data structure, which describes the exposure service model per 3rd Party AF, per analytics information. Moreover, NEF services can be extended to include the services defined herein.

According to a second alternative, which is PCF based, the NEF can be extended with the functionality to operate according with the exposure service models and to configure and maintain the AVR data structure, which describes the exposure service model per 3rd Party AF, per analytics information. Moreover, PCF services can be extended to include the services defined herein.

In the following, embodiments of the disclosure will be described in more detail which are based on the first alternative above, i.e. a NEF based extension of the 3GPP 5G network architecture defined in TS 23.501.

According to an embodiment, the Analytics Function 403 can be provided by a NWDAF as defined in TS 23.501. According to an embodiment, the NF1 101 with analytics exposure to 3rd Party method can be provided by a NEF as defined in TS 23.501. According to an embodiment, NF2 401, which is a possible intermediary NF to be used between NF1 101 and the Analytics Function 403, can be provided by a UDM (compatible with specifications on TS 23.502 Clause 4.15.3.2.3).

According to an embodiment, the services of NEF 101 are extended to support one or more of the following services: a new service "Nnef_AnalyticsVisibilityManagement" for configuration and management of the Analytics Visibility Rule (AVR) data structure; output fields for the "Nnef_EventExposure_Subscribe" service operation that enable the 3rd Party AF 201 to determine the reason of a rejection of a request to remove any ambiguity between response codes indicating the request was forbidden due to wrong fields (e.g., as TS 29.122 defines) or because it is not allowed in the AVR data structure; and/or authorization indicated as necessary to be performed by the NEF 101 for enabling the subscription/requests from the 3rd Party AFs 201 to be consistent with the AVR data structure according to embodiments of the invention (thus, operators can specify the AVR data structure for each 3rd Party AF 201, and/or each 3rd Party AF association with each allowed analytics).

In the following, services and/or service operations implemented in embodiments of the disclosure will be described in more detail for supporting the different exposure service models implemented by embodiments of the disclosure.

According to an embodiment, a new service for managing the Analytics Visibility Rule (AVR) data structure is provided. The table illustrated in FIG. 6 provides more details about the new service implemented by the NEF 101 according to an embodiment of the disclosure in order to manage the analytics visibility rule data structure that is used by the NEF 101 for the authorization and subsequent interaction with the NWDAF 403 for subscription/request of analytics information desired by the 3rd Party AF 201.

The "Nnef_EventExposure_Subscribe" service operation for a conventional NEF defines as possible outputs, as specified in TS 23.502 Clause 5.2.6.2.2:

"Outputs (required): When the subscription is accepted: Subscription Correlation ID. Outputs (optional): First corresponding event report is included, if available (see clause 4.15.1)."

Embodiments of the disclosure extend the output of the "Nnef_EventExposure_Subscribe" service operation of the NEF 101 to include the field "Failure Reason" described herein.

The table illustrated in FIG. 7 describes fields of the AVR data structure as implemented by embodiments of the disclosure. The fields of table 7 related to the inbound and outbound visibility and parameters values reflect the same set of input and output parameters defined in the NWDAF service operations, where the definitions of the interfaces are specified in 3GPP TS 23.502 and TR 23.791:

Nnwdaf_EventsSubscription_Subscribe (inbound parameters), Nnwdaf_EventsSubscription_Notify (outbound parameters), Nnwdaf_AnalyticsInfo_Request_request (inbound parameters), Nnwdaf_AnalyticsInfo_Request_response (outbound parameters), Nnwdaf_Reccomendation_Subscribe (inbound parameters), Nnwdaf_Reccomendation_Notify (outbound parameters), Nnwdaf_Reccomendation_Request_request (inbound parameters), Nnwdaf_Reccomendation_Request_response (outbound parameters).

In the following, embodiments of the disclosure will be described in more detail in the specific context of 3GPP 5G networks.

Figure 8:
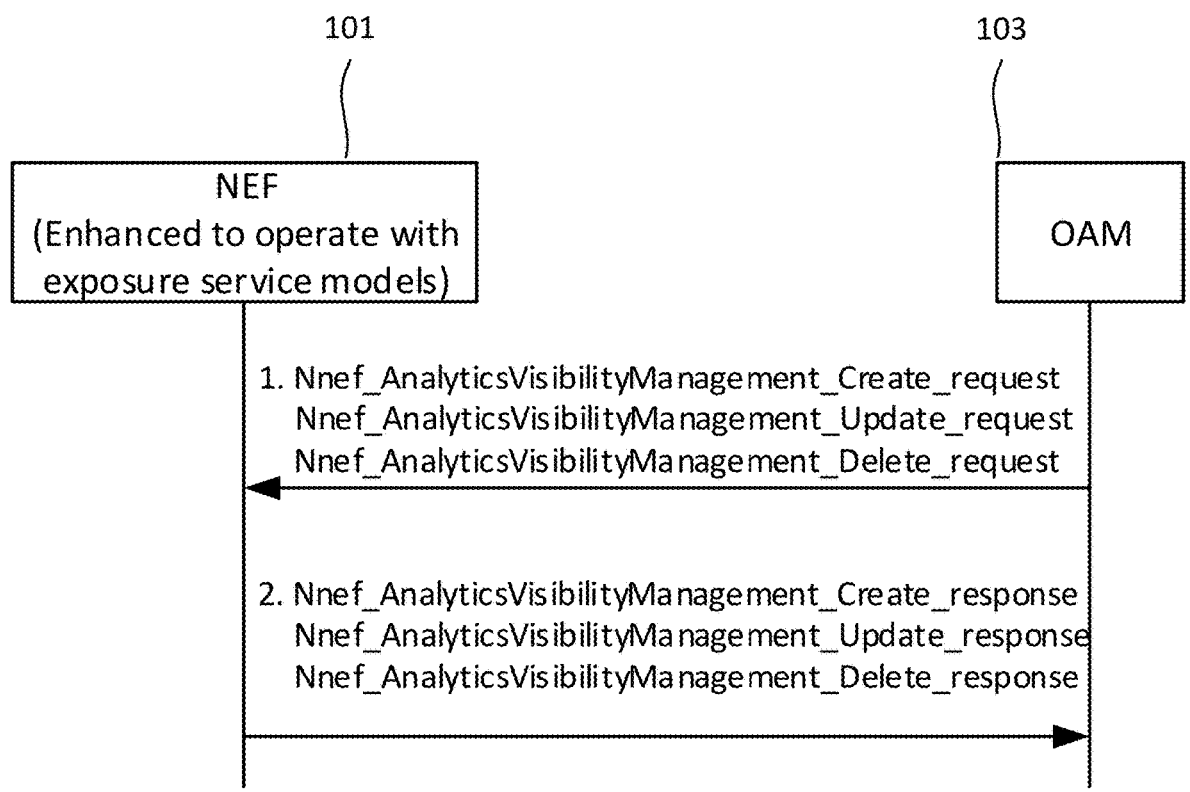
FIG. 8 is a diagram illustrating a procedure for managing AVR information as implemented by embodiments of the disclosure.

Further referring to FIG. 8, embodiments of the disclosure provide procedures for managing AVR information. The steps illustrated in FIG. 8 provide more details about the steps for configuring service exposure models illustrated in FIG. 1.

In a first step (illustrated as step 1 in FIG. 8), the operator, i.e. OAM 103, may invoke the "Nnef_AnalyticsVisibilityManagement" service operation from the NEF 101 to create or update the Analytics Visibility Rule (AVR) information to be used by the NEF 101 for the authorization of 3rd Party AFs requesting analytics information, and subsequent subscription to NWDAF services to receive the analytic information requested by the 3rd Party AF 201. In addition, the OAM 103 can also use this NEF service for deleting an existing AVR data structure.

In a further step (illustrated as step 2 in FIG. 8), the NEF 101 may reply to the OAM 103 with a confirmation, in the positive case of creation, update, or deletion of the AVR data structure with a "Nnef_AnalyticsVisibilityManagement" response message.

Figure 9:
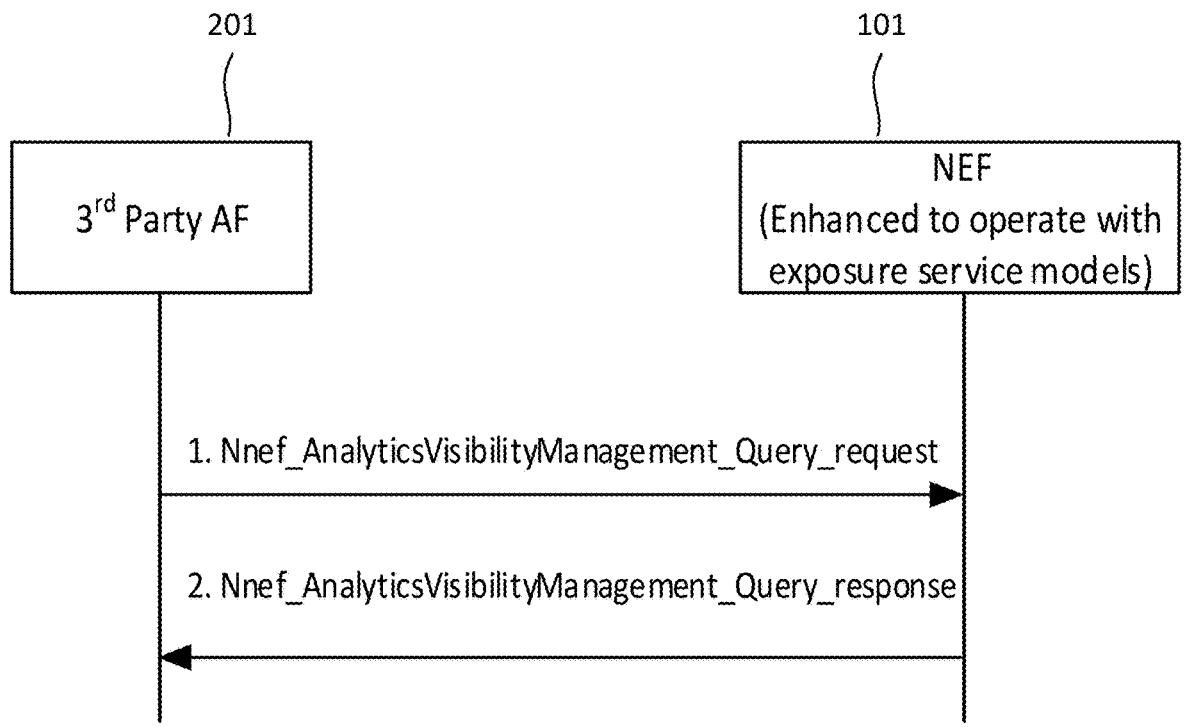
FIG. 9 is a diagram illustrating a procedure for querying AVR information as implemented by embodiments of the disclosure.

Further referring to FIG. 9, embodiments of the disclosure provide procedures for AF Querying the NEF 101 for allowed NWDAF analytics. The steps illustrated in FIG. 9 provide more details about the steps for querying AVR information depicted in FIG. 2. The 3rd Party AF 201 may query the NEF 101 to get information on the allowed analytics information it can consume. In order to avoid unnecessary repetitions, in the following only the "AnalyticsVisibilityManagement" service operation implemented by the NEF 101 according to embodiments of the disclosure will be described, with the understanding that similar embodiments for the subscribe/notify mode for retrieving AVR information are covered by the present disclosure as well.

In a first step (illustrated as step 1 in FIG. 9), one or more 3rd Party AFs 201 may invoke the "Nnef_AnalyticsVisibilityManagement_Query" service operation from the NEF 101 to query the allowed analytics information they can consume. The query request can include the AF identifier and optionally a list of analytics identifiers (such as analytics EventIDs defined in TR 23.791). If no analytics information is indicated, the NEF 101 will return all analytics information that can be consumed by the 3rd Party AF 201.

In a further step (illustrated as step 2 in FIG. 9), the NEF 101 sends the response of the "Nnef_AnalyticsVisibilityManagement_Query" service operation with the analytics information allowed to be consumed by the 3rd Party AF 201. In addition, the response can contain the inbound parameters that the 3rd Party AF 201 can use for requesting each analytics information.

Figure 10:
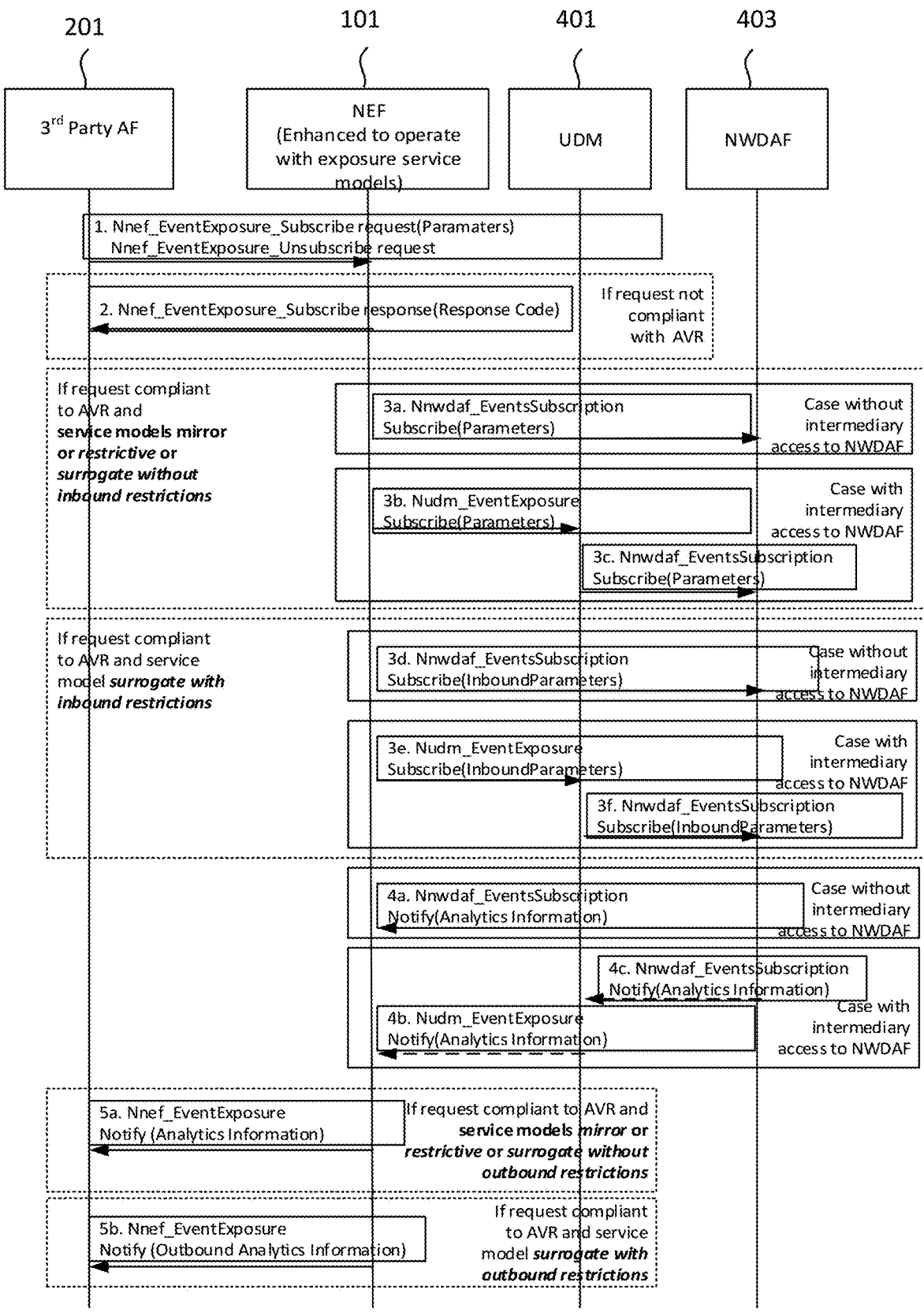
FIG. 10 is a diagram illustrating a procedure for consuming analytics information from a NEF using exposure service models as implemented by embodiments of the disclosure.

Further referring to FIG. 10, embodiments of the disclosure provide procedures for analytics information exposure to 3rd Party AFs 201, as already described above. The steps illustrated in FIG. 10 provide more details about the steps for using exposure service models for consuming analytics information illustrated in FIG. 4.

In a first step (illustrated as step 1 in FIG. 10), the 3rd Party AF 201 invokes the "Nnef_EventExposure_Subscribe request" service operation from the NEF 101 to subscribe to analytics information. The input parameters can be the AF ID, analytics information identifier (e.g., EventID), and/or Event Filter Information, and/or Event Reporting Information, and/or optional preferences on analytics, and/or Observation period, and/or Target of Event Reporting. In case the 3rd Party AF 201 might invoke the "Nnef_EventExposure_Unsubscribe" service operation to cancel a subscription to an analytics information, the input parameter to be used can be the AF ID, and an analytics identifier (i.e., EventID).

If the 3rd party AF subscription/request does not comply with the AVR, the NEF 101 does not forward the request further to the NWDAF 403 and sends using the "Nnef_EventExposure_Subscribe_Response" service operation a rejection response to the 3rd Party AF 201 with the defined Response codes, as illustrated in step 2 of FIG. 10).

Otherwise, i.e. if 3rd party AF subscription/request is compliant with the AVR, the NEF 101 subscribes to the NWDAF 403 in accordance with the exposure service model associated with the 3rd Party AF subscription/request.

As illustrated in step 3a of FIG. 10, if no inbound restrictions apply and the NEF 101 can directly subscribe/request analytics information to/from the NWDAF 403, the NEF 101 may invoke the "Nnwdaf_EventsSubscription_Subscribe request" service operation from the NWDAF 403 using as input parameters the same parameters from the 3rd Party AF 201 as defined in the first step of FIG. 10.

As illustrated in step 3b of FIG. 10, if no inbound restrictions apply and the NEF 101 cannot directly subscribe/request analytics information to/from the NWDAF 403, the NEF 101 may invoke the "Nudm_EventExposure_Subscribe request" service operation from the UDM 401 using as input parameters the same parameters from the 3rd Party AF 201 as defined in step 1 of FIG. 10. The UDM 401, in turn, if the NEF 101 is authorized, may invoke the "Nnwdaf_EventsSubscription_Subscribe" request service operation from the NWDAF 403 using as input parameters the same parameters received in the subscription request from the NEF 101, as illustrated in step 3c of FIG. 10.

As illustrated in step 3d of FIG. 10, if inbound restrictions apply and the NEF 101 can directly subscribe/request analytics information to/from the NWDAF 403, the NEF 101 may invoke the "Nnwdaf_EventsSubscription_Subscribe request" service operation from the NWDAF 403, wherein the NEF 101 uses the inbound parameters defined by the operator in the AVR data structure for the 3rd Party AF (AF ID) and requested analytics information (EventIDs) when invoking the operation from the NWDAF 403.

As illustrated in steps 3e and 3f of FIG. 10, if inbound restrictions apply and the NEF 101 cannot directly subscribe/request analytics information to/from the NWDAF 403, the NEF 101 may invoke the "Nudm_EventExposure_Subscribe request" service operation from the UDM 401 using the inbound parameters defined by the operator in the AVR data structure for the 3rd Party AF (AF ID) and requested analytics information (EventIDs) when invoking the operation from the UDM 401. The UDM 401, in turn, if the NEF 101 is authorized, invokes the "Nnwdaf_EventsSubscription_Subscribe request" service operation from the NWDAF 403 using as input parameters the same parameters received in the subscription request from the NEF 101. In this case, the UDM 401 is not aware of the exposure service models, and just subscribes to the NWDAF 403, on behalf of the NEF 101, using the input parameters defined by the NEF 101.

According to embodiments of the disclosure, the NWDAF 403 generates the subscribed/requested analytics information and, using its "Nnwdaf_EventSubscription_Notify" service operation, sends a notification/response with the analytics information to the subscribers.

As illustrated in step 4a of FIG. 10, if the NEF 101 can directly subscribe to the NWDAF analytics information to be exposed to the 3rd Party AFs 201, then the NEF 101 may be one subscriber to the analytics information and will receive the notification from the NWDAF 403.

As illustrated in steps 4b and 4c of FIG. 10, if the NEF 101 cannot directly subscribe to NWDAF analytics information to be exposed to the 3rd PartyAFs 201, then the UDM 401 is the subscriber that receives the analytics information from the NWDAF 403, and the UDM 401, using its "Nudm_EventExposure_Notify" service operation, sends the notification with the analytics information to its subscribers, in this case the NEF 101.

According to embodiments of the disclosure, the NEF 101, upon receiving a notification/response from the NWDAF 403 (i.e. in case the NEF 101 can directly subscribe/request analytics information from the NWDAF 403 to expose such information to the 3rd Party AFs 201) or from the UDM 401 related to analytics information for the 3rd Party AFs 201 (i.e. in case the NEF 101 cannot directly subscribe/request analytics information from the NWDAF 403 to expose such information to the 3rd Party AFs 201), the NEF 101 sends a notification/response to the 3rd Party AF 201 in accordance with the exposure service model associated with the 3rd Party AF 201 for the subscription/request.

More specifically, if no outbound restrictions apply, the NEF 101 using the "Nnef_EventExposure_Notify" service operation sends to the 3rd Party AF 201 the same analytics information received from the NWDAF 403 and/or the UDM 401, as illustrated in step 5a of FIG. 10.

If outbound restrictions apply, the NEF 101 applies to the analytics information received from the NWDAF 403 and/or the UDM 401 the outbound restriction defined in the AVR data structure for the 3rd Party AF 201 associated with the analytics information and, then, the NEF 101 using the "Nnef_EventExposure_Notify" service operation sends the outbound analytics information to the 3rd Party AF 201, as illustrated in step 5b of FIG. 10.

Figure 11:
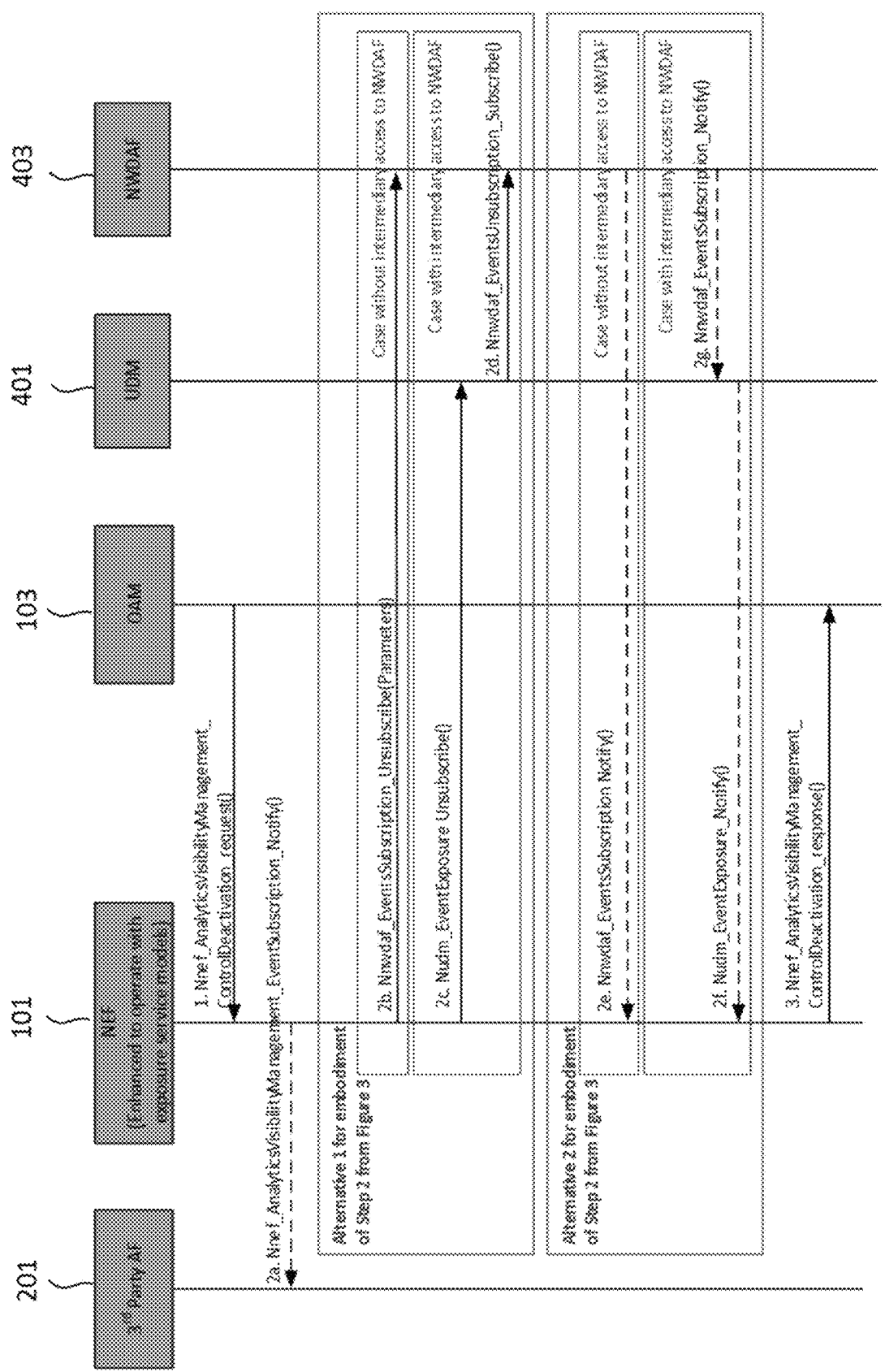
FIG. 11 is a diagram illustrating a procedure for controlling the deactivation of temporal restrictions of exposure service models as implemented by embodiments of the disclosure.

Further referring to FIG. 11, embodiments of the disclosure provide procedures for applying temporal restrictions to the exposure of analytics information to the 3rd Party AFs 201, as already described above. The steps illustrated in FIG. 11 provide two further alternatives of the embodiments illustrated in FIG. 3. Here, embodiments for the temporal deactivation of a configured AVR data structure for a 3rd Party AF are described with the following alternative embodiments considered for step 2 of FIG. 3.

According to a first alternative, the generation of the analytics information associated with the temporarily deactivated AVR may be interrupted. This solution might lead the NWDAF 403 also to further stop data collection required for the generation of the analytics information associated with the temporarily deactivated AVR.

According to a second alternative, there is no interruption of the generation of the analytics information associated with the temporarily deactivated AVR, but the generated analytics information is not exposed to the 3rd Party AF 201 anymore.

More specifically, in step 1 of FIG. 11, the OAM 103 invokes the "Nnef_AnalyticsVisibilityManagement_ControlDeactivation_request" service operation exposed by the NEF 101 to temporarily deactivate an AVR data structure associated with a 3rd Party AF 201.

In response thereto, the NEF 101 may trigger the necessary steps to enforce the deactivated temporal restrictions of an AVR.

More specifically, as illustrated in step 2a of FIG. 11, the NEF 101 may notify using the "Nnef_AnalyticsVisibilityManagement_EventSubscription_Notify" service operation the 3rd Party AF 201 about the changes of the temporal aspects of the analytics information requested by the 3rd Party AF 201.

An alternative embodiment implemented by the steps 2b, 2c and 2d of FIG. 11, which will be described in more detail in the following, is based on the above first alternative with an interruption of the generation of analytics information.

More specifically, as illustrated in step 2b of FIG. 11, if the NEF 101 can directly unsubscribe to NWDAF analytics information, then the NEF 101 may invoke the "Nnwdaf_EventsSubscription_Unsubscribe_request" service operation provided by the NWDAF 403 to unsubscribe to the analytics information(s) associated with the temporarily deactivated AVR.

As illustrated in steps 2c and 2d of FIG. 11, if the NEF 101 cannot directly unsubscribe to the NWDAF analytics information, then the NEF 101 may invoke the "Nudm_EventExposure Unsubscribe_request" service operation provided by the UDM 401 to unsubscribe to the analytics information associated with the temporarily deactivated AVR, and UDM using "Nnwdaf_EventsSubscription_Unsubscribe_request" service operation offered by NWDAF will further unsubscribe to the analytics information(s) associated with the temporarily deactivated AVR.

An alternative embodiment implemented by the steps 2e, 2f and 2g of FIG. 11, which will be described in more detail in the following, is based on the above second alternative with blocking analytics exposure to the 3rd Party AF 201.

More specifically, as illustrated in step 2e of FIG. 11, if the NEF 101 can directly subscribe to the NWDAF analytics information to be exposed to the 3rd Party AFs 201, then the NWDAF 403 using its "Nnwdaf_EventsSubscription_Notify" service operation may provide the NEF 101 with the generated analytics information. The NEF 101 may check the AVR associated with the received analytics information and block this information to be further sent to the 3rd Party AFs 201 when the AVR is temporarily deactivated, for instance, by discarding the received analytics information instead of sending it to the 3$^{rd}$ Party AF that subscribed/requested such information.

As illustrated in steps 2f and 2g of FIG. 11, if the NEF 101 cannot directly subscribe to the NWDAF analytics information to be exposed to the 3rd Party AFs 201, then the UDM 401 is the subscriber that receives the analytics information from the NWDAF 403, and the NWDAF 403 using its "Nnwdaf_EventsSubscription_Notify" service operation provides the UDM 401 with the generated analytics information. The UDM 401, in turn, using its "Nudm_EventExposure_Notify" service operation, sends the notification with the analytics information to the NEF 101. The NEF 101 checks the AVR associated with the received analytics information and blocks this information to be further sent to the 3rd Party AFs 201 when the AVR is temporarily deactivated, for instance, by discarding the received analytics information instead of sending it to the 3$^{rd}$ Party AF that subscribed/requested such information.

In a further step (illustrated as step 3 in FIG. 11), the NEF 101, using the "Nnwef_AnalyticsVisibilityManagement_ControlDeactivation_response" service operation, may indicate to the operator the status of the requested temporal restriction action. This step can occur in parallel or before steps 2e-2f of FIG. 11.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely a logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. A network exposure function (NEF) in a mobile communication network, comprising:
at least one processor; and
a non-transitory computer-readable storage medium storing a program executable by the at least one processor, the program including instructions to:
obtain, from a third party application function, a subscription request requesting to subscribe to analytics information of the mobile communication network; and
in response to obtaining the subscription request, obtain first analytics information from a network data analytics function (NWDAF) of the mobile communication network, and send a notification message to the third party application function, according to one or more rules, wherein the notification message comprises second analytics information corresponding to the first analytics information, wherein the one or more rules are configured to the NEF by an operator of the mobile communication network, and the one or more rules are one or more inbound restrictions related to one or more parameters or parameter ranges of analytics information which the third party application function is allowed to request access to or subscribe to, or is not allowed to request access to or subscribe to, or the one or more rules are one or more outbound restrictions related to one or more parameters or parameter ranges of analytics information which the third party application function is allowed to receive in response to a request or a subscription.

2. The NEF of claim 1, wherein the NEF is configured to send the notification message comprising the second analytics information to the third party application function in response to the subscription request in a case that the subscription request complies with the one or more rules.

3. The NEF of claim 2, wherein the second analytics information is the first analytics information after the one or more outbound restrictions are applied.

4. The NEF of claim 1, wherein the one or more rules relate to analytics information that the third party application function is not allowed to access.

5. The NEF of claim 1, wherein a rule of the one or more rules comprises one or more of the following elements:
an identifier of the rule;
an identifier of the third party application function;
an identifier of the analytics information; or
an identifier of an exposure service model associated with the one or more rules.

6. The NEF according to claim 1, wherein the first analytics information is generated by the NWDAF of the mobile communications network.

7. A mobile communication network, comprising:
a network exposure function (NEF);
a third party application function; and
a network data analytics function (NWDAF),
wherein the NEF is configured to:
obtain, from the third party application function, a subscription request requesting to subscribe to analytics information of the mobile communication network;
in response to obtaining the subscription request, obtain first analytics information from the NWDAF, and send a notification message to the third party application function, according to one or more rules, wherein the notification message comprises second analytics information corresponding to the first analytics information, wherein the one or more rules are configured to the NEF by an operator of the mobile communication network, and the one or more rules are one or more inbound restrictions related to one or more parameters or parameter ranges of analytics information which the third party application function is allowed to request access to or subscribe to, or is not allowed to request access to or subscribe to, or the one or more rules are one or more outbound restrictions related to one or more parameters or parameter ranges of analytics information which the third party application function is allowed to receive in response to a request or a subscription.

8. The mobile communication network according to claim 7, wherein the first analytics information is generated by the NWDAF of the mobile communications network.

9. The mobile communication network according to claim 7, wherein the second analytics information is the first analytics information after outbound restrictions are applied.

10. The mobile communication network according to claim 7, wherein the NEF is configured to send the notification message to the third party application function in response to the subscription request in a case that the subscription request complies with the one or more rules.

11. The mobile communication network according to claim 7, wherein the one or more rules are rules related to one or more aspects of analytics information that the third party application function is allowed to request to access or to subscribe to.

12. The mobile communication network according to claim 7, wherein the one or more rules are rules related to one or more aspects of analytics information that the third party application function is not allowed to request access to or subscribe to.

13. A method, comprising:
obtaining, by a network exposure function (NEF) in a mobile communication network from a third party application function in the mobile communication network, a subscription request requesting to subscribe to analytics information of the mobile communication network; and
in response to obtaining the subscription request, obtaining first analytics information from a network data analytics function (NWDAF) of the mobile communication network, and sending a notification message to the third party application function, according to one or more rules, wherein the one or more rules are configured to the NEF by an operator of the mobile communication network, wherein the notification message comprises second analytics information corresponding to the first analytics information, and the one or more rules are one or more inbound restrictions related to one or more parameters or parameter ranges of analytics information which the third party application function is allowed to request access to or subscribe to, or is not allowed to request access to or subscribe to, or the one or more rules are one or more outbound restrictions related to one or more parameters or parameter ranges of analytics information which the third party application function is allowed to receive in response to a request or a subscription.

14. The method of claim 13, wherein sending the notification message to the third party application function, comprises:
sending, by the NEF to the third party application function, the notification message in a case that the subscription request complies with the one or more rules.

15. The method according to claim 13, wherein the first analytics information is generated by the NWDAF of the mobile communications network.

16. The method according to claim 13, wherein the second analytics information is the first analytics information after outbound restrictions are applied.

17. The method according to claim 13, wherein the one or more rules are rules related to one or more aspects of analytics information that the third party application function is allowed to request to access or to subscribe to.

18. The method according to claim 13, wherein the one or more rules are rules related to one or more aspects of analytics information that the third party application function is not allowed to request access to or subscribe to.

* * * * *